(12) United States Patent
Gantzer

(10) Patent No.: US 6,773,595 B2
(45) Date of Patent: Aug. 10, 2004

(54) COMPARTMENTALIZED FACULTATIVE LAGOON AND METHOD OF CREATING AND MAINTAINING SUCH A LAGOON

(76) Inventor: Charles J. Gantzer, 905 W. 48th St., Minneapolis, MN (US) 55409-2342

( * ) Notice: Subject to any disclaimer, the term of this patent is extended or adjusted under 35 U.S.C. 154(b) by 127 days.

(21) Appl. No.: 10/112,125

(22) Filed: Mar. 29, 2002

(65) Prior Publication Data

US 2002/0139747 A1 Oct. 3, 2002

Related U.S. Application Data

(60) Provisional application No. 60/279,932, filed on Mar. 29, 2001.

(51) Int. Cl.$^7$ .................................................. C02F 3/30
(52) U.S. Cl. ....................... 210/605; 210/615; 210/630; 210/747; 210/916; 210/150
(58) Field of Search ................................. 210/605, 615, 210/630, 150, 151, 220, 170, 747, 916

(56) References Cited

U.S. PATENT DOCUMENTS

| | | |
|---|---|---|
| 3,614,072 A | 10/1971 | Brodie |
| 3,701,727 A * | 10/1972 | Kormanik .................... 210/605 |
| 3,794,171 A | 2/1974 | Kimura et al. |
| 3,794,303 A | 2/1974 | Hirshon |
| 3,884,804 A | 5/1975 | Robinson et al. |
| 3,933,628 A | 1/1976 | Varani |
| 3,956,124 A | 5/1976 | Fast et al. |
| 4,201,663 A | 5/1980 | Rollag et al. |
| 4,202,762 A | 5/1980 | Fontein et al. |
| 4,209,388 A | 6/1980 | DeFraites |
| 4,251,361 A | 2/1981 | Grimsley |
| 4,280,911 A | 7/1981 | Durda et al. |
| 4,293,506 A | 10/1981 | Lipert |
| 4,416,781 A | 11/1983 | Bailey et al. |
| 4,477,393 A | 10/1984 | Kos |
| 4,514,343 A | 4/1985 | Cramer et al. |
| 4,672,691 A | 6/1987 | DeGarie et al. |
| 4,724,086 A | 2/1988 | Kortmann |
| 4,806,148 A * | 2/1989 | Ottengraf .................... 210/151 |
| 4,944,872 A | 7/1990 | Kantor |
| 4,965,022 A | 10/1990 | Litz |
| 4,995,980 A * | 2/1991 | Jaubert ....................... 210/150 |

(List continued on next page.)

FOREIGN PATENT DOCUMENTS

| | | |
|---|---|---|
| JP | J6 0025-592 A | 7/1983 |
| RU | 889631 | 12/1981 |

OTHER PUBLICATIONS

Today's Farmer, Jun./Jul. 1966, "Mixed Blessing" by Chuck Lay, pp. 4–9.
Water Science Technology, vol. 22, No. 9, pp. 43–50, 1990, published in Great Britain, T.J. Schulz and D. Barnes.

(List continued on next page.)

*Primary Examiner*—Christopher Upton
(74) *Attorney, Agent, or Firm*—Gray, Plant, Mooty, Mooty & Bennett, P. A.

(57) ABSTRACT

Compartmentalization of contents of a facultative lagoon into two separate zones improves the economic efficiency of the lagoon for emission control by eliminating macroscopic mixing between the zones, while allowing odor-causing compounds from the anaerobic zone to pass into the aerobic zone. A physical barrier compartmentalizes or divides the lagoon contents into an upper aerobic zone and a lower anaerobic zone. Odor-causing compounds biologically convert within the aerobic zone into olfactorily inoffensive compounds that release into the atmosphere. An aeration device aerates the aerobic layer. Emission of hydrogen sulfide, ammonia, volatile acids, phenols and other odorous gases from anaerobic wastewater and manure lagoons or basins is reduced.

10 Claims, 5 Drawing Sheets

U.S. PATENT DOCUMENTS

| | | | |
|---|---|---|---|
| 5,049,265 A | 9/1991 | Boyd et al. | |
| 5,096,577 A | 3/1992 | Ngo et al. | |
| 5,234,595 A | 8/1993 | DiGregorio et al. | |
| 5,256,281 A | 10/1993 | Ngo et al. | |
| 5,314,619 A | 5/1994 | Runyon | |
| 5,316,671 A | 5/1994 | Murphy | |
| 5,400,549 A | 3/1995 | Morgan | |
| 5,549,828 A | 8/1996 | Ehrlich | |
| 5,624,562 A | 4/1997 | Scroggins | |
| 5,630,936 A | 5/1997 | Oyzboyd | |
| 5,736,049 A | 4/1998 | Bundy et al. | |
| 5,861,095 A | 1/1999 | Vogel et al. | |
| 6,071,418 A | 6/2000 | Tai | |
| 6,103,123 A | 8/2000 | Gantzer | |
| 6,136,185 A | 10/2000 | Sheaffer | |
| 6,346,193 B1 * | 2/2002 | Bauer | 210/615 |
| 6,514,410 B1 * | 2/2003 | Gantzer | 210/605 |
| 6,558,548 B2 * | 5/2003 | Svirklys et al. | 210/615 |

OTHER PUBLICATIONS

Generic Environmental Impact Statement on Animal Agriculture: A Summary of the Literature Related to Air Quality and Odor; *A Summary of the Literature Related to Social, Environmental, Economic and Health Effects,* University of Minnesota, Sep. 1999.

Swine Manure Storage Covers for Odor Control, Applied Engineering in Agriculture, 15(5): 567–572 (1999).

Odor and Volatile Organic Compound Emission Control, WEF Specialty Conference Proceedings, The Omni Jacksonville Hotel, Jacksonville, Fla., Apr. 24–27, 1994.

* cited by examiner

COMPARTMENTALIZED FACULTATIVE LAGOON AND METHOD OF CREATING AND MAINTAINING SUCH A LAGOON

CROSS-REFERENCE TO RELATED APPLICATION

This application claims the benefit of U.S. Provisional Patent Application Ser. No. 60/279,932 filed on Mar. 29, 2001.

BACKGROUND OF THE INVENTION

The basic function of a lagoon system is to adequately store and treat liquid waste, such as wastewater, livestock manure, etc., to control unwonted odors and for ultimate return to the environment. Anaerobic (no oxygen present) lagoons or basins store and treat high-strength wastewater and livestock manure. Anaerobic bacteria (requiring no oxygen) found in these basins can generate various odorous gases that ultimately discharge into the atmosphere. The emitted odorous gases can include hydrogen sulfide, ammonia, volatile acids, phenols, etc. The emitted noxious gases additionally may provide health concerns for surrounding human and animal populations. Aerobic bacteria (oxygen-requiring) can biologically destroy these odorous gases. In the presence of oxygen, aerobic bacteria can convert hydrogen sulfide into sulfate anions, ammonia into nitrite and nitrate anions, and volatile odorous organic compounds into carbon dioxide. The technical problem in such conversions involves providing a sufficiently large aerobic zone within an initially anaerobic basin to biologically destroy odorous gases without incurring high operating costs associated with aerating the entire anaerobic basin contents.

One method of creating an aerobic zone within an anaerobic basin is to convert the anaerobic basin into a facultative lagoon by aerating only an aqueous layer at the basin surface. Municipal and industrial wastewater treatment industries have used facultative lagoons for decades to meet treatment objectives with reduced aeration costs. Facultative lagoons typically consist of a basin in which solids in the wastewater and/or aqueous livestock manure settle to the bottom as a sediment layer that decomposes anaerobically. The term facultative describes the aerobic-anaerobic nature of the lagoon—an anaerobic bottom zone covered by an aerobic top zone. The biodegradable organic materials that do not settle can degrade aerobically due to oxygen present in the aerobic top zone. The aerobic zone depth and content constantly fluctuate with added waste products and changing meteorological conditions.

Field studies suggest that a "clean" water layer an inch or so thick at the lagoon surface can drastically reduce odorous gas emissions. The top water layer can be kept "clean" by outside-the-basin treatment (an aerobic wastewater treatment plant along side the anaerobic storage basin) or inside-the-basin treatment (facultative lagoon). Self-purification (i.e., preferential biodegradation of odorous compounds) in the aerobic zone requires dissolution of oxygen therein. A variety of sources can supply oxygen, including biological sources (algae growth), chemical sources (addition of hydrogen peroxide), and mechanical means (aeration). Dissolution of ozone also may facilitate biodegradation of certain odorous gases. Livestock and industrial anaerobic storage basins often have such high initial oxygen demands that biological and chemical oxygen addition is technically or economically prohibitive.

Mechanical devices can introduce oxygen into the aerobic zone from the atmosphere or oxygen gas as bubbles. Dissolution efficiency depends on the size and residence time of the added bubbles. Smaller bubble sizes (with more surface area and slower bubble rise velocities) and deeper submergence depths (depth of the bubble source below the lagoon surface) result in improved oxygen dissolution efficiencies. Thus, there are two competing mechanisms: overall aeration costs dictate minimum treatment volumes (i.e., smaller or shallower aerobic zones), while oxygen dissolution efficiency dictates greater water depths.

The aerobic bacteria found in the upper layer of a facultative lagoon oxidize the odorous compounds generated in the lower anaerobic layer. The wastewater-treatment approach to a facultative lagoon is to maintain aerobic conditions in the upper one to two feet of the water column. Oxygen concentrations of 0.5 to 2.0 mg/L ensure that oxygen is not the rate-limiting substrate in the biological oxidation of BOD (biological or biochemical oxygen demand) and ammonia. BOD is a primary indicator of the amount of pollution in wastewater. However, if the treatment objective is to reduce the emission of hydrogen sulfide, ammonia, and other odorous effluent gases from an anaerobic basin, then the traditional wastewater treatment approach to a facultative lagoon can be excessive in terms of operating costs.

Anaerobic storage basins and anaerobic treatment lagoons typically range in depth from about 8-ft to about 12-ft deep, generally in areas where land is readily available or relatively inexpensive. For various industrial and municipal applications, where land is more expensive or not readily available, anaerobic storage and treatment basins can be deeper (e.g., about 15-ft to about 18-ft deep). Anaerobic storage basins generate odors that are released by two general mechanisms: (1) diffusive transport across the water surface (volatilization), and (2) transport of odorous gases to the water surface within gas bubbles and subsequent bursting of gas bubbles at the water surface to release odorous gases to the atmosphere. Oxygen demand and aeration efficiency will determine the depth of the aerobic layer in a facultative lagoon.

Ideally, the operation of a facultative lagoon for odor control should supply just enough aeration to biodegrade the odorous compounds that would otherwise be released into the atmosphere. The low-cost operational goal of a facultative lagoon for emission control is to minimize the volume of water that needs aeration and to supply just enough aeration to biodegrade the target odorous compounds. It is difficult to substantially reduce the volume of water requiring aeration with a traditional facultative lagoon, because the aerators used to create the aerobic layer will generate a certain degree of mixing between the aerobic and anaerobic layers. This unavoidable mixing removes aerobic bacteria from the aerobic layer and introduces high strength wastewater into the aerobic layer. Hence, sufficient aeration capacity must be supplied to a facultative lagoon (1) to generate additional aerobic bacteria to replace those lost to the anaerobic layer and (2) to oxidize odorous compounds added to the aerobic layer by mixing.

BRIEF DESCRIPTION OF THE INVENTION

A compartmentalized facultative lagoon comprises a lower anaerobic zone containing aqueous-based liquid organic anaerobic waste material with odor-causing compounds; an upper aerobic zone containing aqueous-based liquid material; a source of aeration positioned within the aerobic zone adapted and designed to aerate only the aerobic zone; and a porous barrier that compartmentalizes the zones from each other to eliminate macroscopic mixing between the zones while permitting passage of the odor-causing compounds from the lower to the upper zones. The compartmentalized facultative lagoon facilitates the aerobic biological conversion of the odor-causing compounds created within the anaerobic zone into olfactorily inoffensive compounds.

The porous barrier can be a porous membrane positioned horizontally between the zones. The lagoon can be about eight–twelve feet in depth and the porous barrier can be positioned about one–two feet below the surface of the liquid. The porous membrane can be less dense or more dense than water. The lagoon can include a biofilm on one or both surfaces of the porous membrane. A biofilm on an under surface of the porous membrane can be an anaerobic biofilm. A biofilm on an upper surface of the porous membrane can comprise aerobic bacteria located near an upper surface of the biofilm and anaerobic bacteria located near the porous membrane. The source of aeration can be an aeration device, such as an airlift aerator, a pump-driven aspirator that supplies air bubbles to the aerobic zone, a static air tube aerator, or a propeller-based aspirator.

A method of creating and maintaining a compartmentalized facultative lagoon comprises providing an anaerobic basin containing aqueous-based liquid organic anaerobic waste material; positioning a barrier below the surface of the basin material to compartmentalize the basin into an anaerobic zone below the barrier and an aerobic zone above the barrier, the barrier being porous to the odor-causing compounds generated by the material within the anaerobic basin while eliminating macroscopic liquid mixing between the zones; and positioning a source of aeration within the aerobic zone and aerating only the aerobic zone. The method facilitates biological aerobic conversion of the odor-causing compounds within the anaerobic zone into olfactorily inoffensive compounds.

Positioning the barrier can comprise positioning the porous membrane horizontally between the zones. Providing an anaerobic basin can comprise providing a basin about eight–twelve feet in depth. Positioning the barrier can comprise positioning the barrier about one–two feet below the lagoon surface. The barrier can be less dense or more dense than water. Positioning the barrier can comprise developing a biofilm on one or both surfaces of the porous membrane. A biofilm on an under surface of the porous membrane can be an anaerobic biofilm. A biofilm on an upper surface of the porous membrane can comprise aerobic bacteria located near an upper surface of the biofilm and anaerobic bacteria located near the porous membrane. The source of aeration can be an aeration device, such as an airlift aerator, a pump-driven aspirator that supplies air bubbles to the aerobic zone, a static air tube aerator, or a propeller-based aspirator

DESCRIPTION OF THE INVENTION

Figure 1:
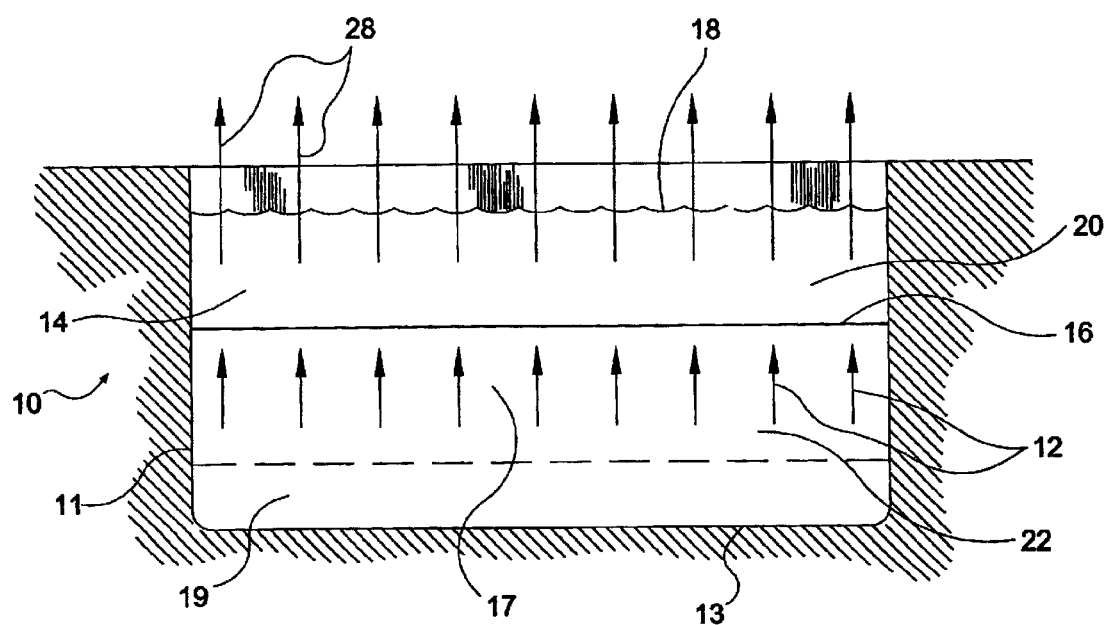
FIG. 1 is a diagram of a compartmentalized facultative lagoon for reducing the emission of offensive odors from basins storing and treating high-strength organic wastewater.

The invention is a compartmentalized facultative lagoon and a method of creating and maintaining such a lagoon. A physical barrier compartmentalizes or divides the inventive lagoon into two zones, an aerobic and anaerobic zone, to improve the economic efficiency of emission control by preventing or eliminating macroscopic mixing between the zones. The upper zone of the inventive facultative lagoon is aerobic, and the lower zone is anaerobic. The anaerobic zone contains aqueous-based liquid organic anaerobic waste material that generates odor-causing compounds. The aerobic zone contains aqueous-based liquid material with odor-causing compounds generated within the aerobic zone that biologically convert within the aerobic zone into olfactorily inoffensive compounds. Only the aerobic layer is aerated, for example, with an aeration device. In an illustrative embodiment, the physical barrier or sheet is generally horizontal. In another illustrative embodiment, the sheet is porous. The inventive compartmentalized facultative lagoon, and the inventive method of creating and maintaining a compartmentalized facultative lagoon result in reduction of emission of hydrogen sulfide, ammonia, volatile acids, phenols and other odorous gases from initially anaerobic wastewater and manure basins. Dissolved chemicals in the anaerobic zone, responsible for emission of hydrogen sulfide, ammonia, volatile acids, phenols and other odorous compounds, transport across the porous sheet into the aerobic zone, where they are biologically oxidized into olfactorily inoffensive compounds that ultimately release into the surrounding atmosphere or may remain in solution.

For the compartmentalized facultative lagoon and method of this invention, mechanical aeration (oxygen introduced from the atmosphere) or oxygenation (oxygen introduced as oxygen gas) must meet the oxygen demand associated with preferentially biodegrading odorous gases, distribute aerated water over the porous partition, and not be prohibitively expensive. The aeration technology must encourage mixing of the aerobic zone contents to prevent formation of odor-releasing anaerobic areas. The aerobic zone may suitably be between about 1.5–2-ft in depth. Illustratively, an aeration technology effective in aerating a shallow body of water (less than about 3-ft deep) can effectively aerate the aerobic zone of this invention. As with self-purification, aeration can be outside or inside the basin. Water can be removed from the aerobic zone, aerated, and returned to the aerobic zone, but this is a less economical alternative.

Several different types of mechanical aerators can be used within the aerobic zone. A pump-driven aspirator (water pumped through a Venturi injector using either atmospheric or pure oxygen) can create horizontal plumes of water with entrained gas bubbles. Pump-driven aspirators (sometimes called ejectors) are commercially available from ITT Flygt and other wastewater treatment manufacturers. A suitable pump-driven aspirator available from Oxyzone Systems Incorporated draws ozone-enhanced air into the pumped water. In addition to pumps, spinning propellers can also create the water current required for aspiration and aeration.

Various types of suitable propeller-driven aspirators are also commercially available through several manufacturers, including Aeromix Systems, Inc. and Aeration Industries. Many of the aerators available from the manufactures listed herein are suitable for use in the present invention.

Another aeration option is to take advantage of the entire lagoon depth to improve aeration efficiency. Sealed plumbing or depressions extending below the normal depth of the porous partition can be used to contain the aeration equipment. Decreasing the depth or volume of the aerobic zone increases the functional importance of the aerobic biofilms on the upper surface of the porous partition relative to the importance of the suspended aerobic bacteria, resulting in lower odorous compound concentrations in the aerobic zone. Aeration efficiency decreases as the water in the aerobic zone becomes shallower.

The compartmentalized facultative lagoon and method of this invention can reduce odorous emissions from volatilization and bubble transport. The aerobic bacteria suspended in the aerobic layer and attached to the porous partition biodegrade odorous gases that would otherwise be emitted by volatilization. One of the advantages of the porous partition is that it physically intercepts gas bubbles. Once impinged on the porous partition, odorous gases can dissolve into the surrounding water (to be biodegraded by the aerobic bacteria in the aerobic water zone and within the aerobic biofilm on the porous partition upper side). Breakup of gas bubbles into smaller gas bubbles results in faster odorous gas dissolution, or gas bubbles can slowing migrate into the porous partition for direct biodegradation by the aerobic biofilm found on the partition upper side. Thus, instead of rapid discharge into the atmosphere of gas bubbles created in the anaerobic sludge layer, the porous partition physically intercepts the bubbles and increases the potential for biodegradation of odorous gases within the gas bubbles.

Figure 2:
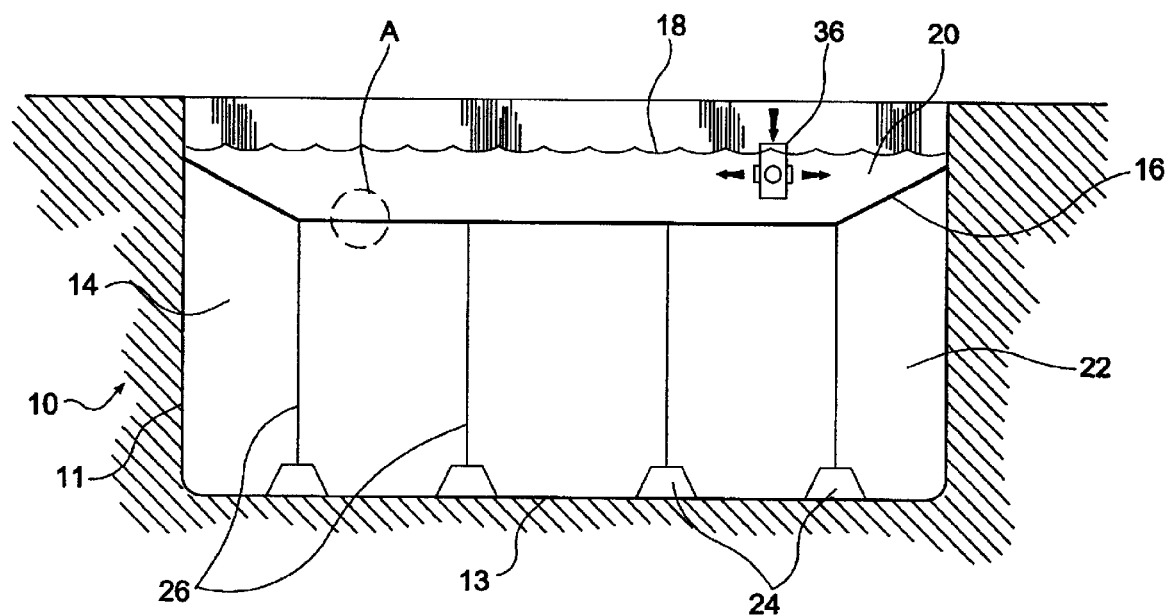
FIG. 2 is a schematic diagram of emission control technology for a compartmentalized facultative lagoon consisting of an aerated zone above a porous sheet or membrane, and an anaerobic zone beneath the porous sheet or membrane.

FIG. 1 is a schematic diagram of an inventive compartmentalized facultative lagoon 10 for reducing the emission of offensive odors 12 from basins 14 storing and treating high-strength aqueous-based liquid anaerobic organic waste material, such as wastewater, manure and the like. Sidewalls 11 and a floor 13 form the basin 14. Initially, liquid organic waste material 17 mixed with or suspended in water fills the basin 14. Suspension of a sheet or membrane 16 at about one to two feet below the water surface 18 physically compartmentalizes the anaerobic basin 14 into an aerobic (aerated) zone 20 above the sheet 16 and an anaerobic (non-aerated) zone 22 below the sheet 16, thereby forming the inventive compartmentalized facultative lagoon 10. Any residual sedimentary material 19 will collect on the bottom of the basin 14. As shown in FIG. 1, the sheet 16 may be horizontal. The sheet 16 may also be porous, for purposes explained later herein. If the sheet 16 is denser than water, it is suspended in place to prevent it from sinking to the bottom of the lagoon 10. For example, a series of floats and tethers (not shown) may suspend the sheet 16 in place. If the porous sheet 16 is less dense than water (e.g., polypropylene felt or geotextile), it is held in place to prevent it from floating out of position. For example, FIG. 2 illustrates the use of anchors 24 and tethers 26 to hold a buoyant sheet 16 in place. The sheet 16 prevents or eliminates macroscopic mixing between contents of the upper aerated zone 20 and the lower anaerobic zone 22. Slow diffusion and advection meter transport of the dissolved compounds or chemicals through the porous sheet 16 from the lower anaerobic zone 22 to the upper aerated zone 20. Thus, dissolved chemicals responsible for emission of hydrogen sulfide ($H_2S$, $HS^-$), ammonia ($NH_3$, $NH_4^+$), and other odors (e.g., volatile acids, phenols) 12 transport across the porous sheet 16 and into the aerated (aerobic) zone 20. The aerobic zone 20 is supplied with dissolved oxygen to biologically oxidize odorous gasses into relatively inoffensive compounds 28 that eventually are releases into the surrounding atmosphere 15 or retained in solution.

FIG. 2 is a schematic diagram of emission control technology for formatting an anaerobic basin 14 as an inventive compartmentalized facultative lagoon 10. A porous sheet or membrane 16 divides the anaerobic basin 14 into an aerated zone 20 above and an anaerobic zone 22 beneath the porous sheet 16. The porous sheet or membrane 16 is of a structure or composition that compartmentalizes the zones 20, 22 from each other to eliminate macroscopic mixing between the zones 20, 22 while permitting passage of odor-causing compounds 12 from the lower 22 to the upper zones 20. In addition to compartmentalizing the anaerobic basin 14 into aerobic 20 and anaerobic 22 zones, the suspended porous sheet 16 provides surface area for the attachment of biological films or biofilms 32, 34.

Figure 3:
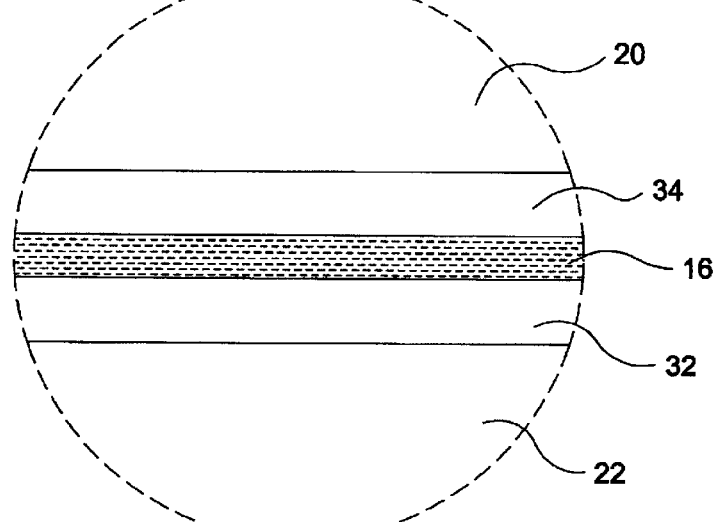
FIG. 3 is an enlargement of the area designated as A in FIG. 2, illustrating the biofilms on the upper and lower surfaces of the porous sheet.

FIG. 3, which is an enlargement of the area designated A in FIG. 2, shows the biofilms 32, 34 in detail. A biofilm 32, 34 refers to a layered culture of microorganisms growing on a surface within an aquatic environment. The biological films (biofilms) 32, 34 develop on the topside and underside of the porous sheet 16 and enhance the ability of the emission control technology to reduce emissions of hydrogen sulfide, ammonia, and other odorous gases 12. These biofilms 32, 34 are important in reducing odorous gas emission from the basin 14. First, the anaerobic biofilm 32 on the underside of the porous sheet 16 biologically transforms volatile acids and phenols into carbon dioxide, methane, ammonia, and hydrogen sulfide. Methanogenic bacteria are responsible for the formation of methane, and sulfate-reducing bacteria are responsible for the formation of hydrogen sulfide. Second, the biofilm 34 on the topside of the porous sheet 16 consists of a mixture or gradation of aerobic and anaerobic bacteria. Aerobic bacteria locate near the upper surface of the biofilm 34 (i.e., closer to the lagoon surface), while anaerobic bacteria locate near the porous sheet 16. The combination of aerobic and anaerobic bacteria within the same biofilm 34 is desirable for processing the hydrogen sulfide, ammonia, and odorous organic compounds that escape treatment by the underside anaerobic biofilm 32 or that generate at the underside anaerobic biofilm 32. As illustrated in FIG. 3, the close proximity of the aerobic and anaerobic regions of the topside biofilm 34 allows for more complete processing of the odorous compounds 12 into relatively inoffensive compounds 28 than has previously been possible.

Figure 4:
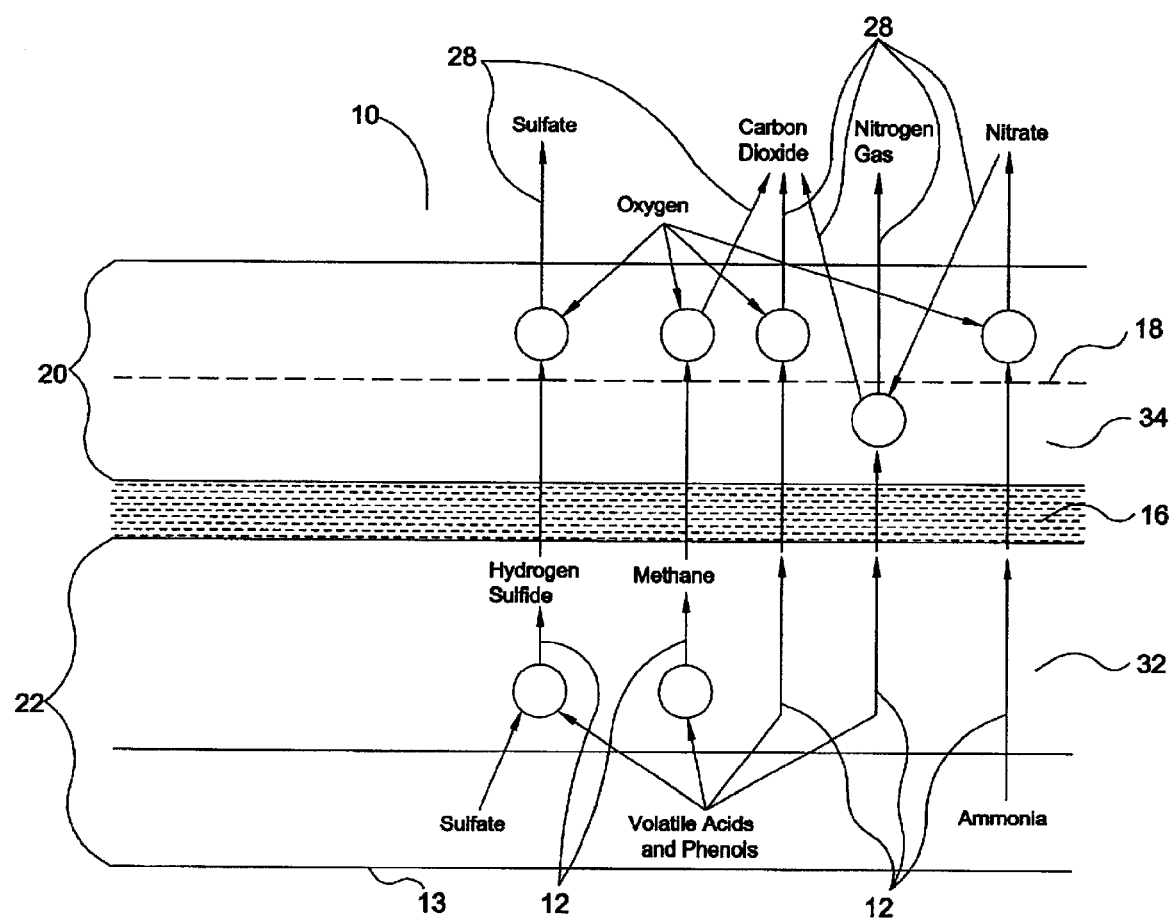
FIG. 4 is a schematic diagram of the microbial processing that occurs within the biofilms attached to the upper and lower surfaces of the porous sheet.

FIG. 4 is a schematic diagram of the microbial processing that occurs in the inventive compartmentalized facultative lagoon 10 within the biofilms 32, 34 attached to the topside and underside of the porous sheet 16. The net result is a conversion of odor-generating compounds (hydrogen sulfide, ammonia, volatile acids, phenols, etc.) 12 into olfactorily inoffensive compounds (sulfate, nitrate, nitrogen gas, carbon dioxide, etc.) 28. Although not illustrated in FIG. 3, other microbial processes can also occur within the biofilms 32, 34, such as anaerobic microbial processes of sulfate reduction and methanogenesis that can occur in the anaerobic portion of the topside biofilm 34. In addition, the aerobic microbial processes that occur in the aerobic portion of the topside biofilm 34 can also occur in the water column of the aerated zone 20. The water column of the aerated zone 20 refers to the volume of the aerated zone 20 apart from the topside biofilm 34.

Several types of aeration devices 36 can supply oxygen to the shallow aerated zone 20 illustrated in FIG. 2. For example, aspirators and propeller-driven aerators 36 used to aerate the shallow water found in shrimp-growing ponds can be used. The anticipated shallowness of the aerated zone 20 (about one to two feet) can compromise the energy efficiency and cost-effectiveness of any aeration equipment 36. Aeration devices 36 tend to be more energy efficient at greater water depths (e.g., eight to ten feet). Another approach would be to use aerators 36 that take advantage of the entire depth of the anaerobic basin 14 for aeration. One approach would be to house aerators 36 in cavities by adding inserts (e.g., a tank) that are open to the aerated zone 20 or by creating the desired cavity 21 formed as an extension of the porous sheet 16. If necessary, the extended cavity 21 may be frame-covered. A second approach would be to have an aerator 36 penetrate the porous sheet 16 through a sealed hole, so that contents of the aerobic 20 and anaerobic zones 22 do not mix.

Figure 5:
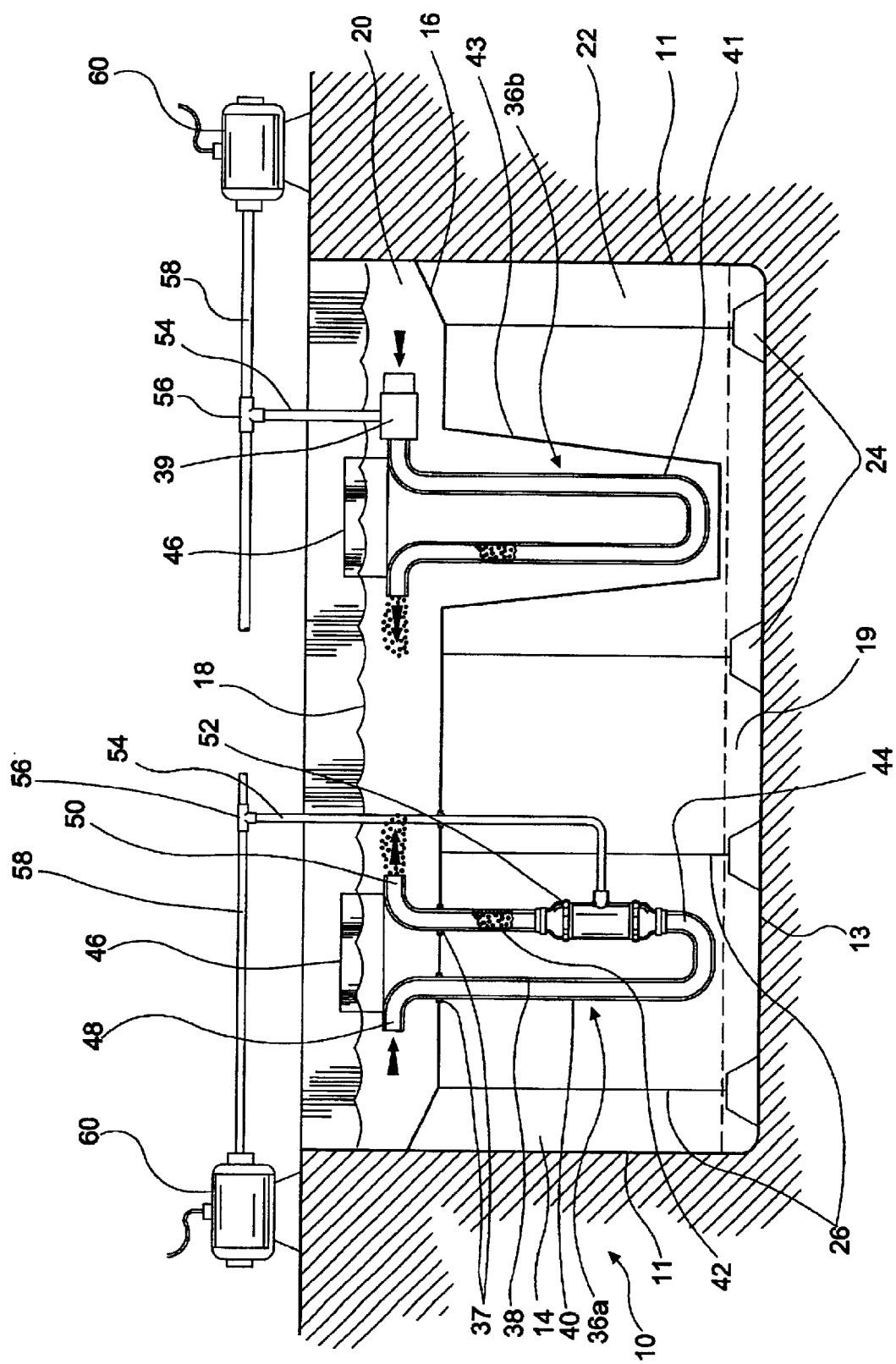
FIG. 5 shows aerators that take advantage of the basin's total depth to improve the energy efficiency of aerating the water above the basin-dividing porous sheet.

FIG. 5 shows aerators 36a, 36b that take advantage of the basin's 14 total depth to dissolve oxygen and to improve the energy efficiency of aerating the aerobic zone 20. FIG. 5 illustrates an aerator 36a penetrating the porous sheet 16 that compartmentalizes the basin 14, with seals 37 between the porous sheet 16 around the aerator 36a to prevent mixing between the aerobic 20 and anaerobic zones 22. Aerator 36a may be an airlift aerator of the type described in U.S. Pat. No. 6,103,123 to Gantzer, issued Aug. 15, 2000, entitled Aeration Device and Method for Creating and Maintaining Facultative Lagoon, the disclosure of which is incorporated herein by reference in its entirety. Airlift aerator 36a, according to U.S. Pat. No. 6,103,123, includes a U-shaped tube body 38 with vertical down flow 40 and airlift legs 42. An elbow 44 connects the legs 40, 42 at their lower ends. A float 46 connected to the upper end of the body 38 sustains the aerator 36a with respect to the lagoon surface 18, i.e., a slight distance beneath the lagoon surface 18. The upper end of the down flow leg 40 has a horizontal water inlet 48. A horizontal water outlet 50 at the top of airlift leg 42 faces the opposite direction of the water inlet 48. Both inlet 48 and outlet 50 locate in the aerobic zone 20 above the barrier sheet 16 and beneath the lagoon surface 18.

A bubble generator or diffuser 52 connects to the lower end of the airlift leg 42 near the elbow 44. The bubble diffuser 52 receives pressurized air through airline 54. The airline 54 extends to a tee 56 connected to a main air pipe 58 extending to an air supply or pump 60. The bubble diffuser 52 generates bubbles in the water in the airlift leg 42 from air supply or pump 60 through the airline 54. The rising bubbles in the airlift leg 42 circulate the water through the U-shaped body 38 beginning at the water inlet 48 and discharging at the water outlet 50.

In operation of the aerator 36a of FIG. 5, the pump 60 provides pressurized air through the main air pipe 58 through the airline 54 into the bubble diffuser 52. Water enters the down flow leg 40 inlet 48, flowing down, around the elbow 44 and up the air uplift leg 42. Passing through the bubble diffuser 52, the water entrains air bubbles. Oxygen transfers from the entrained air bubbles to the water in the aerated zone 20.

FIG. 5 also illustrates an aerator 36b sitting within a cavity 43 created by either a sealed insert or a framed extension of the basin-dividing porous sheet 16. As illustrated, the aerator 36b includes a pump-driven aspirator 39 that supplies air bubbles to the aerobic zone 20 through a U-shaped tube 41 from a pump 60. For example, the aspirator 39 may consist of water pumped through a reduced-diameter nozzle, such as a Venturi nozzle. Faster water velocities and reduced water pressure result within the reduced diameter section of the aspirator 39. Decreased pressure draws air from the airline 54 into the flowing water entering at the inlet 48 and the water discharges at the outlet 50 with entrained air bubbles. Alternatively, the aerator 36b may also function without the pump 60, so that the aspirator 39 draws air bubbles into the U-shaped tube 41 through the airline 54 directly from the atmosphere.

Figure 6:
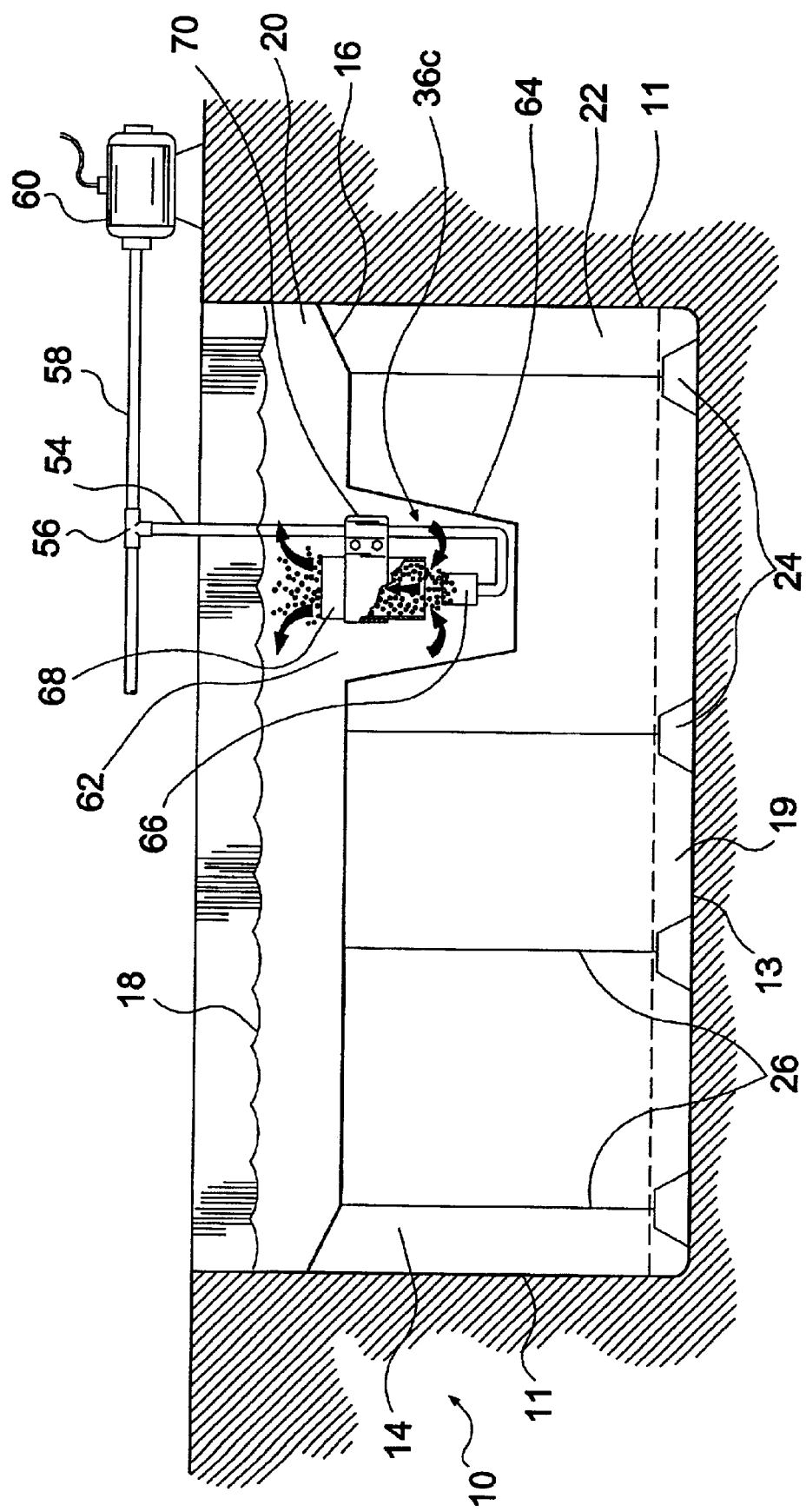
FIG. 6 shows an aerator that uses less than the basin's total depth.

FIG. 6 shows an aeration device 36c for the aerobic zone 20 that takes advantage of less than the entire depth of the facultative lagoon 10. The aeration device 36c may be a static tube aerator 62 installed into a depression 64 in the sheet 16. If desired or necessary for a specific installation, the depression 64 may be supported with a frame. The static tube aerator 62 includes a membrane diffuser 66, such as a membrane dome diffuser typically used in wastewater treatment, located beneath a vertical pipe 68. A bracket or collar 70 may position and stabilize the vertical pipe 68 with respect to the airline 54. In operation, the pump 60 provides pressurized air through the main air pipe 58 through the airline 54 to the membrane diffuser 66. Passing through the membrane diffuser 66, the water entrains air bubbles and travels upwards through the vertical pipe 68. Oxygen transfers to the aerated zone 20 from the entrained air bubbles exiting from the top of the vertical pipe 68. A simple, although less effective, option would involve simply positioning an airstone or other type of diffuser into the depression 64. Any other aeration method or type of aerator may be used that will supply aeration to the aerobic zone 20 without causing unwonted admixture of the contents of the aerobic and anaerobic zones 20, 22. If desired, a number of aerators, of the same or different types, can interconnect in a single lagoon, to meet the varying needs of individual installations.

In summary, one approach for reducing the emission of hydrogen sulfide, ammonia, and other odorous gases 12 from anaerobic basins 14 is with a compartmentalized facultative lagoon 10 and method of to this invention. A porous sheet or membrane 16 physically separates the basin 14 into upper aerobic 20 and lower anaerobic zones 22. The porous sheet 16 prevents or eliminates macroscopic mixing between the zones 20, 22 and reduces the amount of aeration required to control odorous gas 12 emissions. The porous sheet 16 limits diffusive and advective transport of dissolved material from the anaerobic 22 to the aerobic zone 20. The porous sheet 16 also accumulates biofilms 32, 34 on its two surfaces. The biofilms 32, 34 further reduce the loading of bulk BOD and odorous compounds 12 to the basin's aerated zone 20 by biodegrading soluble compounds in the anaerobic underside biofilm 32 and the various layers of the topside biofilm 34. Thus, the use of a basin-dividing porous sheet 16 and aerators 36 provides economic emission control by preventing or eliminating macroscopic mixing between the aerated and anaerobic zones 20, 22 of the lagoon 10 and by limiting the diffusive and advective transport of dissolved materials between the two zones 20, 22. The physical mass transport resistance and the biological processing provided by the biofilm-covered 32, 34 porous sheet 16 are two mechanisms responsible for the reducing the transport of dissolved materials between the zones 20, 22 of the basin. The net result is a reduced volume-specific aeration requirement 36 and a smaller volume of water that requires aeration, which reduces the operating cost for controlling odorous basin emissions 12.

That which is claimed is:

1. A method of creating and maintaining a compartmentalized facultative lagoon comprising:

providing an anaerobic basin containing aqueous-based liquid organic anaerobic waste material;

positioning a barrier below a surface of the anaerobic basin material to compartmentalize the basin into an anaerobic zone below the basin and an aerobic zone above the barrier, the barrier being porous to odor-causing compounds generated by the material within the anaerobic basin while eliminating macroscopic liquid mixing between the zones;

positioning an aeration device within the aerobic zone and aerating only the aerobic zone; and thereby facilitating biological aerobic conversion of the odor-causing compounds within the anaerobic zone into olfactorily inoffensive compounds.

2. A method according to claim 1, wherein positioning the barrier comprises positioning the porous membrane horizontally between the zones.

3. A method according to claim 2, wherein positioning the barrier further comprises developing a biofilm on a surface of the porous membrane.

4. A method according to claim 3, wherein developing a biofilm further comprises developing a biofilm on both surfaces of the porous membrane.

5. A method according to claim 4, wherein the biofilm on an upper surface of the porous membrane is an anaerobic biofilm.

6. A method according to claim 5, wherein the biofilm on an upper surface of the porous membrane comprises aerobic bacteria located near an upper surface of the biofilm and anaerobic bacteria located near the porous membrane.

7. A method according to claim 1, wherein providing an anaerobic basin comprises providing a basin about 8–12 feet in depth and wherein positioning the barrier comprises positioning the barrier about 1–2 feet below a surface of the material.

8. A method according to claim 1, wherein the barrier is less dense than water.

9. A method according to claim 1, wherein the barrier is denser than water.

10. A method according to claim 1, wherein the aeration device is selected from an airlift aerator, an aspirator that supplies air bubbles to the aerobic zone, a static tube aerator, and combinations thereof.

* * * * *